(12) United States Patent
Kassim et al.

(10) Patent No.: US 9,008,632 B1
(45) Date of Patent: Apr. 14, 2015

(54) MOBILE STATION WITH INTERACTIVE MULTIMEDIA RESPONSE AND CALL INTERCEPT MODE

(75) Inventors: Ansar Kassim, Basking Ridge, NJ (US); Maruthachala Arthanari Sengottaiyan, Somerset, NJ (US); Arulvadivel Venugopal, Franklin Park, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 238 days.

(21) Appl. No.: 13/079,608

(22) Filed: Apr. 4, 2011

(51) Int. Cl.
*H04M 3/42* (2006.01)
*H04M 3/22* (2006.01)

(52) U.S. Cl.
CPC ................... *H04M 3/2281* (2013.01)

(58) Field of Classification Search
USPC ....................................................... 455/414.1
See application file for complete search history.

(56) References Cited

U.S. PATENT DOCUMENTS

| | | | |
|---|---|---|---|
| 7,353,016 B2 | 4/2008 | Roundtree et al. | |
| 8,280,360 B2 * | 10/2012 | Stone | 455/417 |
| 2004/0153556 A1 * | 8/2004 | Claes et al. | 709/229 |
| 2005/0233733 A1 * | 10/2005 | Roundtree et al. | 455/414.1 |
| 2005/0234956 A1 * | 10/2005 | Hoennig | 707/101 |
| 2007/0180500 A1 * | 8/2007 | Tanada | 726/4 |
| 2009/0279684 A1 * | 11/2009 | Cowell et al. | 379/265.13 |
| 2012/0003958 A1 * | 1/2012 | Hossain et al. | 455/411 |

FOREIGN PATENT DOCUMENTS

WO    WO 2008/022291 A2    2/2008

* cited by examiner

*Primary Examiner* — Mazda Sabouri

(57) ABSTRACT

A mobile station provides an Interactive Multimedia Response to a user's call. The mobile station detects when a user dials a predetermined telephone number. In response, at least one visual object representing available services is displayed. In response to a user's input, at least one visual object representing a service selected by the user may be displayed. In a Call Intercept Mode, the mobile station detects a telephone number entered by the user to initiate an outgoing call to a destination that provides account-specific data. The mobile station then conducts a data communication with a self service server of the communication service provider to obtain the account-specific data corresponding to the detected telephone number. Upon receiving the account-specific data, at least one visual object including the requested account-specific data is displayed on the mobile device.

18 Claims, 18 Drawing Sheets

MOBILE STATION WITH INTERACTIVE MULTIMEDIA RESPONSE AND CALL INTERCEPT MODE

TECHNICAL FIELD

The present subject matter relates to techniques for operating a mobile station to produce an Interactive Multimedia Response when a user calls a customer service number, so as to provide the user with self service options. Also, the present subject matter relates to techniques for operating a mobile station in a Call Intercept Mode (CIM), in which the mobile station detects a service requesting telephone number entered by the user and presents a visual display specific to the requested service, in lieu of transmitting the outgoing call placed by the user to the corresponding destination.

BACKGROUND

A mobile station user can dial a predetermined number, such as a customer service number, to reach an Interactive Voice Response (IVR) system which may provide one or more selected items of information to the user, or route the call to a call center per the user's request. Once the call reaches the call center, an agent speaks to the customer to resolve her need.

The IVR system interacts with the user, by collecting user inputs entered using a telephone keypad and responding with voice. For example, when the user dials a customer service number, the IVR system greets the user with audio content and guides her using audio step-by-step instructions providing the user with available choices, such as press 1 for hearing your balance, press 2 for bill information, etc. When the user presses a selected key, the IVR responds with an audio response based on the pressed key.

A first time caller has to listen to the entire audio instructions to make a decision on the next course of action—whether to press a certain key to obtain desired information, press 0 to speak with a representative or hang up the phone. Because callers are often impatient and do not want to listen to the entire IVR menu, they often choose to speak to a customer representative directly even though their needs can be achieved using the IVR only.

The problem lies in the fact that voice alone is not sufficient to convince the customers that their needs can be served through an IVR menu. For example, responding to an IVR menu requires a caller to listen to the instructions carefully, sometimes listen to all options, remember the options and then hit the key that is most appropriate. Further, callers may get confused whether to choose one or the other option to achieve their need. In addition, non-native speakers or people with some hearing deficiencies may find it difficult to follow the system generated voice instructions.

Hence, the need exists for a technique to handle issues that could arise when a mobile station user interacts with the IVR system. In particular, there is a need to provide a mobile station with a mechanism that would make it easier to use an interactive response system and reduce the number of calls routed to a live agent.

Moreover, when a user of the mobile station dials a number pre-set for providing an account related service, such as providing account balance, payment, minute or data usage information, a short message service (SMS) message may be sent to the mobile station with requested information. However, this procedure requires the user to perform several steps before the information can be obtained. The user has to listen to a voice response, accept the SMS message, go to the Inbox and read the message. Moreover, as discussed above, if the user dials a customer service number, she also needs to perform several steps until a required service can be obtained.

Therefore, the need exists for a technique that would provide the user with a requested service directly upon dialing the service requesting number, without requiring additional steps.

SUMMARY

The teachings herein provide an effective technique for producing an Interactive Multimedia Response (IMR) to a user's call so as to facilitate the use of an interactive response system, e.g. as an alternative to an IVR call for customer service, and for presenting account related information to the user as a visual display produced in response to detecting the number dialed by the user.

An exemplary method for operating a mobile station to provide the IMR involves detecting a predetermined telephone number entered by the user and in response, displaying at least one first visual object. The first visual object may represent services available to the user. Also, at least one first audio signal corresponding to the first visual object may be produced. In response to a user's input, at least one second visual object may be displayed. The second visual object may represent one of the services selected by the user. Further, at least one second audio signal corresponding to the second visual object may be produced.

The first audio signal may include at least one voice instruction produced to enable the user to make a selection among the services represented by the first visual object. The second audio signal may include at least one voice signal presenting information in connection with the selected service represented by the second visual object.

The user's input may include manual activation of the at least one first visual object. For example, the user may press a respective button displayed on a screen.

In an alternative embodiment, the user's input may include a voice command entered by the user, for example, using a microphone.

The method may be enhanced through inclusion of the step of displaying a video greeting including a visual object, such as a video clip, in response to detecting the predetermined number. The video greeting may provide information on how to use visual objects and audio signals.

Further, a video greeting including a video object, such as a video clip, may be displayed in response to a user input at any stage of the IMR procedure. The video object may correspond to a user input so as to make the video greeting interactive. For example, for different user inputs, different video clips may be pre-recorded.

The predetermined telephone number entered by the user may be a number for initiating an outgoing call to a call center. The detecting step may cause the displaying of the at least one first visual object and producing of the at least one first audio signal.

The input number may be that for an outgoing call to a call center or the like, e.g. for customer service. In such an example, the visual object(s) and audio object(s) are presented in lieu of the outgoing call. However, a user's call may be routed to an appropriate call center, if the user responds to an object by indicating a desire for the assistance of a live person. The appropriate call center may be selected based on context information collected when the user interacts with visual objects. The appropriate call center may differ from the call center corresponding to the input number.

Aspects of the technology discussed in more detail below may also take the form of a program product, such as an article of manufacture. Such an article comprises a machine readable storage medium; and executable code for a mobile station embodied in the medium.

Execution of the code by a processor causes the mobile station to implement functions of the mobile station.

In an example of one such article, execution of the code causes the mobile station to implement functions including detecting a predetermined telephone number dialed by a user of the mobile station, displaying at least one first visual object representing services available to the user, producing at least one first audio signal corresponding to the first visual object, detecting a user's input to display at least one second visual object representing one of the services selected by the user, and producing at least one second audio signal corresponding to the second visual object.

Another aspect of the subject matter discussed below involves a station that comprises a display device for displaying visual objects, an audio device for producing audio signals, and a processor configured for detecting a predetermined telephone number entered by a user of the mobile station to cause the display device to display at least one first visual object representing services available to the user, causing the audio device to produce at least one first audio signal corresponding to the first visual object, detecting a user's input to cause the display device to display at least one second visual object representing one of the services selected by the user, and causing the audio device to produce at least one second audio signal corresponding to the second visual object.

An exemplary method for operating a mobile station in a Call Intercept Mode (CIM) involves detecting user input of a selected one of a plurality of destination numbers on a mobile station, each of the destination numbers corresponding to one of a plurality of account related services. In response to the user input detecting, outgoing communication to a destination otherwise associated with the one detected destination number is intercepted.

Based on execution of a self-service application on the mobile station, a data communication is conducted through a mobile communication network between the mobile station and a self service server of a provider of communication service. The communication through the network includes authentication of the mobile station to the network. Via the communication through the network, the mobile station obtains the server account specific data for the user account and specific to the account related service corresponding to the detected destination number. Based on further execution of the self-service application on the mobile station, a visual display is presented to the user on the mobile station. The visual display includes the data for the user account specific to the account related service corresponding to the detected destination number.

Prior to the detecting step, upon first detecting user input any of the plurality of destination numbers on a mobile station, an inquiry may be sent through the mobile communication network from the mobile station to determine if service calls to the destination numbers should be intercepted. In response to an instruction received through the mobile communication network from the server, an intercepting function on the mobile station may be activated to enable intercepting of outgoing communications responsive to user inputs of the plurality of destination numbers.

The method may further comprise the step responsive to another instruction received through the mobile communication network from the server, to deactivate the intercepting function on the mobile station so as to disable intercepting of outgoing communications responsive to user inputs of the plurality of destination numbers. An interactive voice response function may be performed in response to the user input if the intercepting function is deactivated.

For example, the communication through the network may include a first data call from the mobile station to the self service server performed to provide the authentication of the mobile station, and a second data call from the mobile station to the self service server performed to obtain the server account specific data.

A further aspect of the subject matter described below involves a communication station that comprises a display device for displaying visual objects, a communication circuit for performing a data communication, and a processor configured for detecting a first telephone number entered by a user of the communication station to initiate a first outgoing call for obtaining first account specific data. As a result that the first telephone number has been entered, the processor causes the communication circuit to conduct a data communication between the communication station and a self service server of a communication service provider, to obtain the first account specific data, in lieu of transmitting the first outgoing call to a first destination associated with the first telephone number. Upon receiving the first account specific data, the processor causes the display device to display at least one first visual object including the first account specific data.

Further, the processor is configured to detect a second telephone number entered by a user of the communication station to initiate a second outgoing call for obtaining second account specific data. As a result that the second telephone number has been entered, the processor causes the communication circuit to conduct a data communication between the communication station and the self service server, to obtain the second account specific data, in lieu of transmitting the second outgoing call to a second destination associated with the second telephone number. Upon receiving the second account specific data, the processor causes the display device to display at least one second visual object including the second account specific data.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
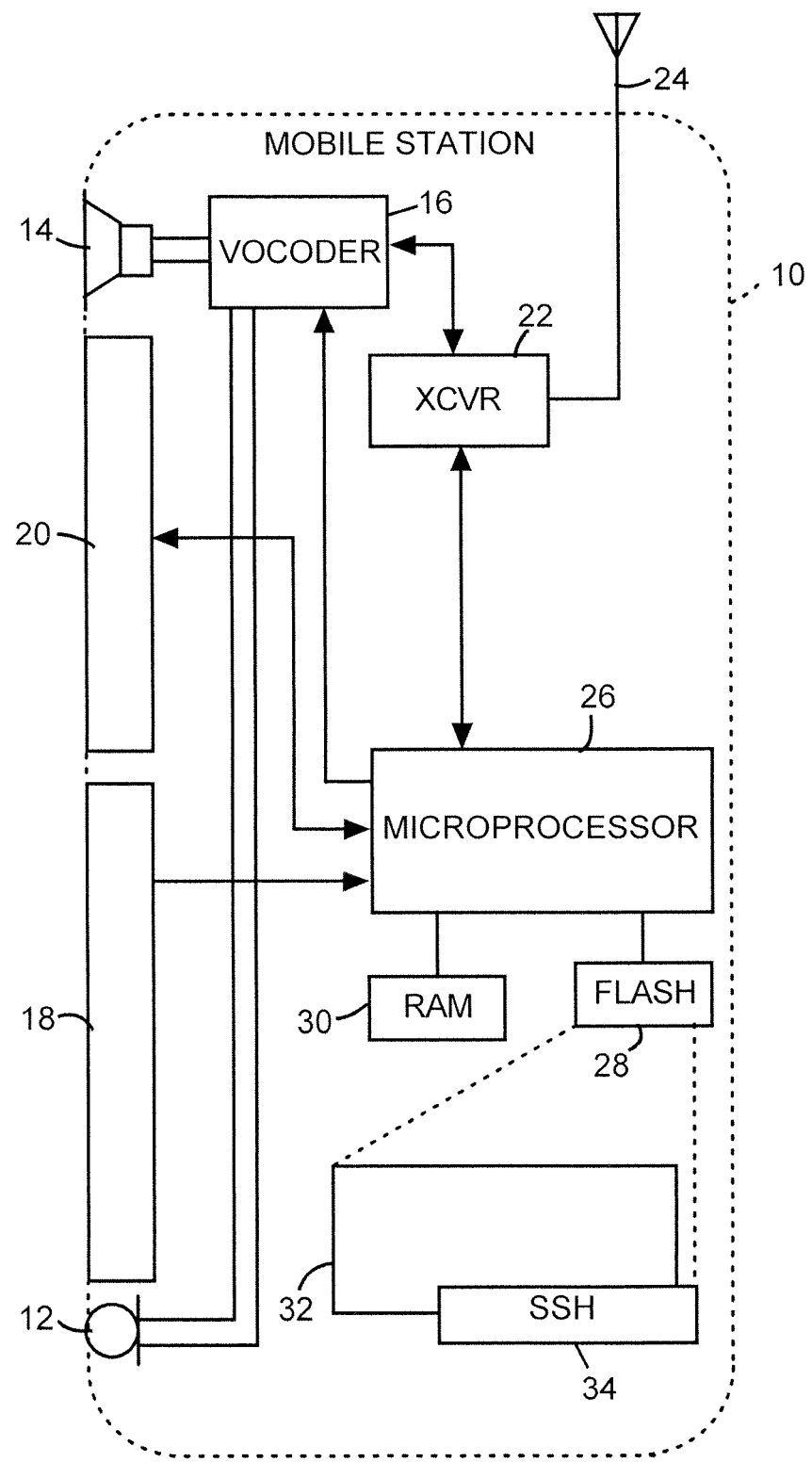
FIG. 1 is a simplified functional block diagram of a mobile station configured to implement an interactive multimedia response of the present disclosure.

FIG. 1 is a block diagram illustrating exemplary functional elements of a mobile station that may implement an Interactive Multimedia Response (IMR) procedure of the present disclosure. Although this example shows a mobile station, one skilled in the art would understand that the IMR procedure may be implemented by any communication device. For discussion purposes, the diagram uses mobile station 10 as the example for illustration of a possible architecture of a mobile station.

Although the mobile station 10 may be incorporated into a vehicle mounted mobile unit or into another device, such as a portable personal computer, tablet computer or PDA, for discussion purposes the illustration shows the mobile station 10 in the form of a handset. The handset embodiment of the mobile station 10 functions as a normal digital wireless telephone station. For that function, the mobile station 10 includes a microphone 12 for audio signal input and a speaker 14 for audio signal output. The microphone 12 and the speaker 14 connect to voice coding and decoding circuitry (vocoder) 16. For a voice telephone call, for example, the vocoder 16 provides two-way conversion between analog audio signals representing speech or other audio and digital samples at a compressed bit rate compatible with the digital protocol of a respective wireless communication network. The microphone 12 and speaker 14 are also used for entering voice commands and producing audio signals for the applications relating, for example, to IMR operations.

As shown, the mobile station 10 includes a keypad 18 and a display 20, for user input and output purposes. The display 20, for example, permits display of a menu, application screen(s), web pages generated by a client browser program or the like, multimedia content stored on the mobile station, such as video, pictures and games, as well as call related information such as dialed and calling party numbers, short message service (SMS) and/or multimedia message service (MMS) messages, etc. The keypad 18 enables input dialing digits for voice and/or data calls (including SMS and MMS destination identifiers/numbers) and generating selection inputs keyed by the user based on a displayed menu or web page. Alternatively, the display 20 may act as a keypad to enable user's input. The display 20 is also used for displaying visual objects for the applications relating, for example, to IMR operations. Of course other user interface elements may be used, such as a stylus and touch sensitive display screen, as in a smart phone or a tablet computer. Also, the mobile station 10 may include other inputs, such as a digital camera (not shown) for image input purposes.

For digital wireless communications, the mobile station 10 also includes a digital transceiver (XCVR) 22. The concepts discussed here encompass embodiments of the mobile station 10 utilizing any digital transceivers that conform to current or future developed digital wireless communication standards, such as LTE, 1x-EVDO or GPRS, although the XCVR 22 may in addition or instead support other wireless communications. The digital transceiver (XCVR) 22 provides voice communications, attendant signaling, SMS communications over the signaling resources of the airlink as well as packet data communications. The transceiver 22 provides two-way wireless communication of information, such as vocoded speech samples and digital message information. The transceiver 22 also sends and receives a variety of signaling messages in support of the various services provided by the mobile station 10. The transceiver 22 connects through RF send and receive amplifiers (not separately shown) to an antenna 24. The mobile station 10 may include one or more additional transceivers (not shown) for operation in an analog mode or in accord with an alternative digital standard.

A microprocessor 26 controls all operations of the handset implementation of the mobile station 10. The microprocessor 26 is a programmable device. The mobile station 10 also includes flash type memory 28 and/or a non-volatile random access memory (RAM) 30, for storing various software routines and mobile configuration settings, such as mobile identification number (MIN), etc. In a present implementation, the memory 28 stores software 32 such as an operating system, vocoder software, client browser software, device driver software, call processing software, short and multimedia message service software, various content and applications. The memory 28 also may store data, such as telephone numbers server addresses and data input by the user via the keypad 18, for example, including telephone numbers or other identifiers (IDs) such as caller IDs, as well as addresses and location identifiers used during communications. As discussed in more detail later, the stored software 32 also includes at least one self-service handset (SSH) application 34 configured for implementing handset-related aspects of the present disclosure.

The SSH application 34 supports self-service options for customers of a wireless service provider, enabling customers to access various services directly from their mobile station 10. The SSH application 34 may connect the mobile station 10 via a wireless network to a remote server of a service provider, such as a wireless service provider. Without additional user interaction, the mobile station 10 may interact with the server to display a menu presenting self-service options, and various screens corresponding to offered services. For example, the SSH application 34 may enable the customer to check account balance, check usage of minutes, messages and data, make payments, manage payment accounts, review previous payments, view current plan and features, change account passwords, activate and manage various programs and promotions offered by the wireless service provider, etc. The inputs to the SSH application 34 can be contextual inputs (for example, defined by the location of the caller), device inputs or user inputs in multimedia format (audio, key stroke, video, gesture etc.).

The mobile station 10 may have the capabilities necessary to present to a user any combination of multimedia objects (images, audio, video, text, etc). For that purpose, various types of multimedia objects can be input and then stored in one or more of the device memories (additional memories not shown may be provided for additional storage capacity for image files and/or other multimedia content); and various types of multimedia objects can be retrieved from device memory, processed and then presented to the user via appropriate output element(s) of the mobile station 10. For example, text input and output for such messages may be provided via the keypad 18 and the display 20; and audio input and output for such messages may be provided via the vocoder 16 in combination with the microphone 12 and the speaker 14.

As noted, the executable code for the mobile station 10 stored in the flash memory 28 includes at least one SSH application program 34 for execution by the microprocessor 26 of the mobile station 10. The SSH application 34 could be written in any programming language supported by the device, for example, in JAVA or BREW. The SSH application 34 may be initially installed on the mobile station 10 (e.g. by the device manufacturer) or may be downloaded as an upgrade using known techniques.

The structure and operation of the mobile station 10, as outlined above, were described by way of example, only. The software 32 of the mobile station 10 causes the microprocessor 26 to execute an IMR procedure by running the SSH application 34 that may monitors telephone numbers dialed or otherwise selected by a user of the mobile station 10. In particular, as illustrated in a call flow shown in FIG. 2, an IMR procedure 100 involves detecting in step 102 that the user dials or selects from a contact list a predetermined telephone number such as a customer service number *611. The contact list may be pre-established by the system to include frequently dialed numbers or may be produced by the user.

In response to detecting the dialed predetermined number, rather than making a voice call or sending a message to the number, the SSH application 34 causes the microprocessor 26 to connect the mobile station 10 via a wireless network to a server of a service provider. The SSH application 34 interacts with the server to provide at the display 20 visual objects presenting a menu of self-service options available to the user, and various visual objects corresponding to offered services (block 104), in lieu of initially making an outgoing call to the predetermined telephone number.

Figure 2:
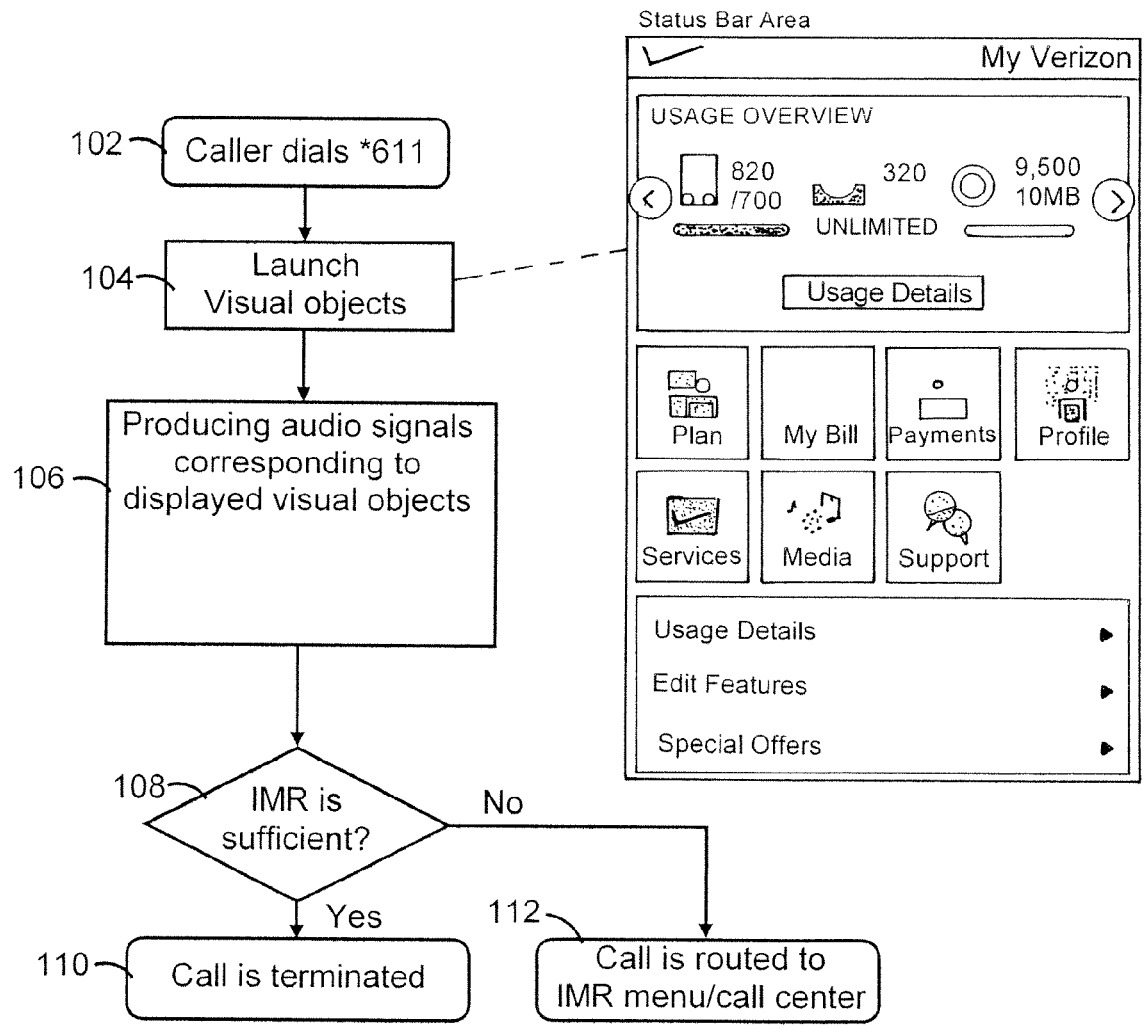
FIG. 2 is a flow diagram illustrating an interactive multimedia response procedure of the present disclosure.

As an example of the menu of self service options, FIG. 2 illustrates a menu initiated by My Verizon Handset (MVH) application provided by Verizon Wireless®. The MVH application causes the mobile station 10 to display a menu screen having a usage overview "My usage" field showing usage of minutes, messages and data for the user's mobile station account with the service provider. Also, the menu screen shows fields enabling users to check their current plans, bills and profiles, and to make payments. Other fields on the screen show various other services and media applications available to users. A support field on the screen provides additional information that may be needed. In addition, users are enabled to determine usage details, edit features and read special offers.

Further, the SSH application 34 causes the mobile station 10 to produce audio signals corresponding to displayed visual objects (step 106). The audio signals are generated by the SSH application 34 so as to correspond to the visual objects currently presented in the video menu. As discussed in more detail below, the audio signals may suggest the caller to click on the respective fields displayed on the screen to obtain desired account information and/or to perform desired account related functions.

In particular, the SSH application 34 may cause the mobile station 10 to output audio signals via the speaker 14. These audio signals may be produced so as to correspond to the video objects currently displayed on the display 20.

Figure 3:
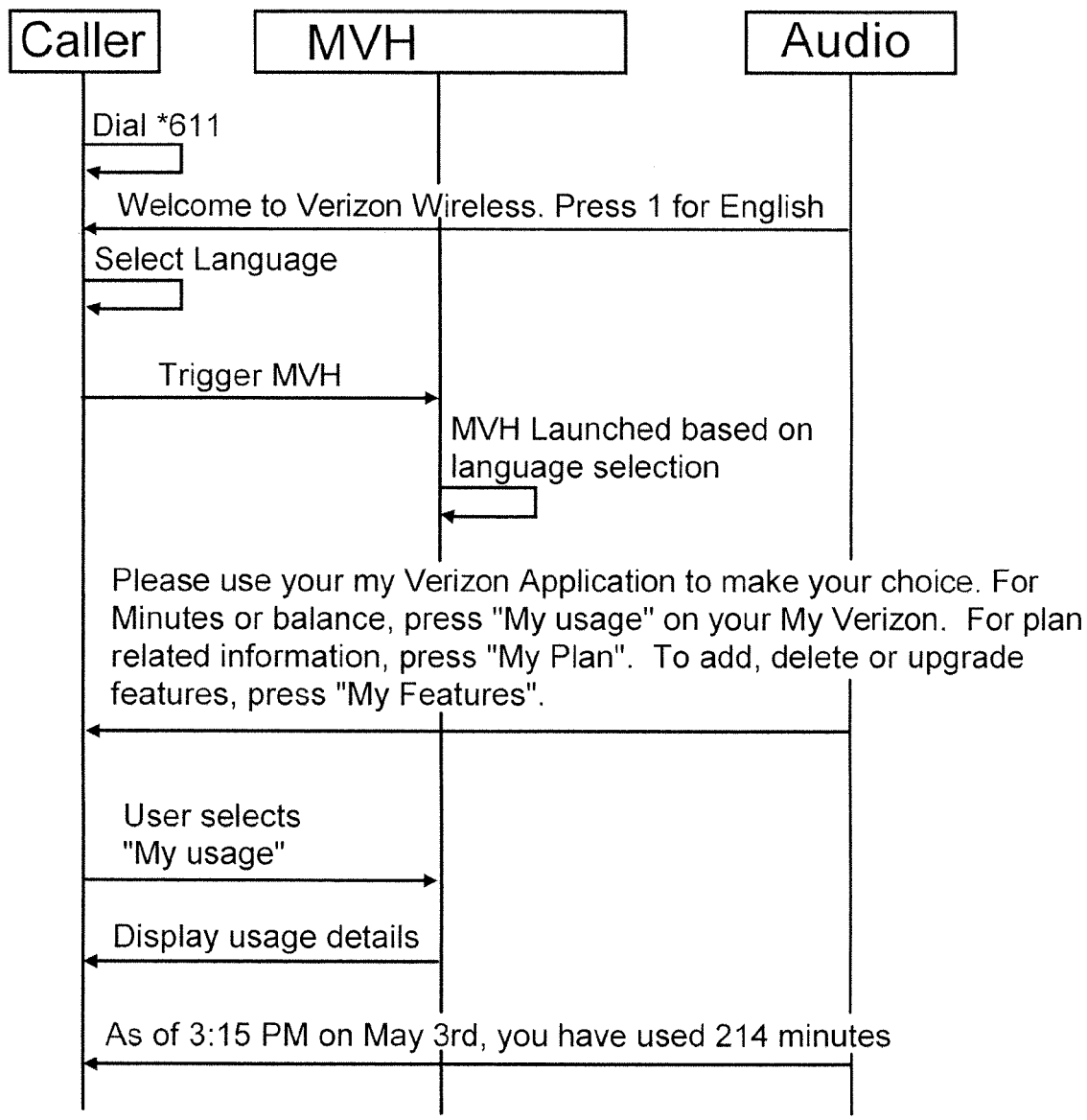
FIG. 3 is an example illustrating interaction between a user, visual objects and audio signals during the interactive multimedia response procedure.

For example, FIG. 3 illustrates interactions between a caller that uses the mobile station 10 to dial a predetermined number, such as the customer service number *611, visual objects provided by the SSH application 34, such as MVH visual objects presented by the MVH application, and the audio signals generated by the SSH application 34. When the caller dials the *611 number, the SSH application 34 may respond to the caller by producing an audio greeting, such as "Welcome to Verizon Wireless." Also, the audio signals generated by the SSH application 34 may suggest pressing an appropriate key for selecting the language, such as "Press 1 for English."

When the caller selects a desired language, the SSH application 34 causes the mobile station 10 to display video objects including images with texts in the language selected by the caller. For example, the display 20 may display a screen showing visual objects that represent the MVH menu of available self-service options.

After producing the visual objects, the SSH application 34 may produce an audio signal suggesting the caller to use the options displayed on the screen to make her choice. For example, the speaker 14 may produce the following audio signal: "For Minutes or balance, press "My usage;" for plan related information, press "My Plan;" to add or upgrade features press My Features."

In response, the caller may select "My usage" video object displayed on the screen. Based on the user's selection, the SSH application 34 may display visual objects showing usage details, such as usage of minutes, messages and data, and produce the corresponding audio signals indicating usage details, such as "As of 3:15 PM on May $3^{rd}$, you have used 214 minutes."

Hence, the IMR procedure 100 involves responding to a user's call by producing an audio signal that corresponds to a visual object displayed on the screen at the time when the audio signal is produced. The audio signal may suggest the user to activate one of multiple visual objects on the screen to obtain a desired service. For example, if the display 20 is a touch screen display, the user may touch the selected object on the screen in response to audio instructions.

When a desired visual object is selected, the SSH application 34 may cause the mobile station 10 to display a next screen presenting one or more different visual objects. When the next screen is displayed, the SSH application 34 may generate a further audio signal corresponding to the visual object displayed on the next screen.

Figure 4:
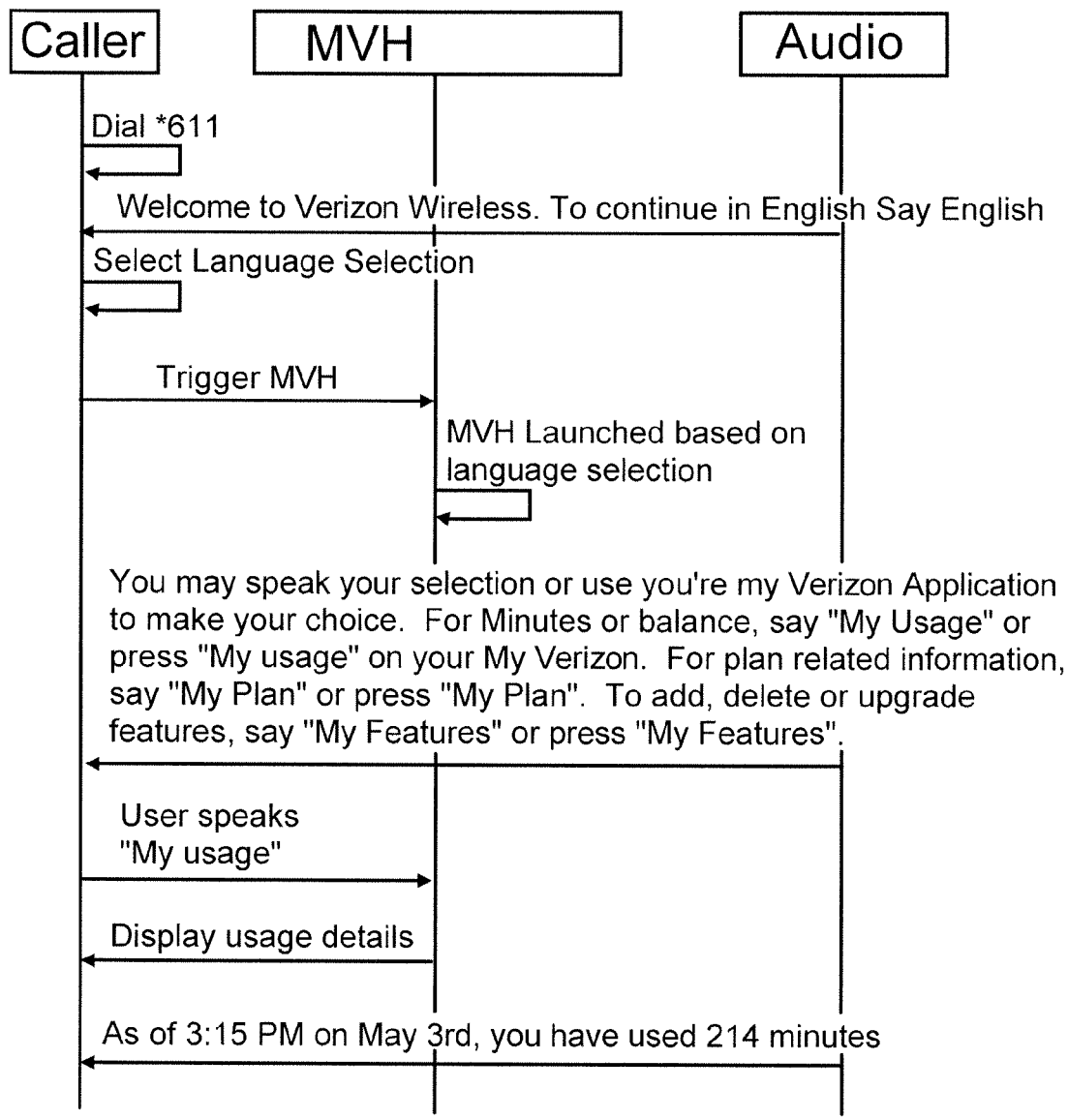
FIG. 4 is a further example of interaction between a user, visual objects and audio signals during the interactive multimedia response procedure.

FIG. 4 illustrates an alternative example of interactions between the caller, the visual objects, such as the MVH visual objects, and the audio signals presented by the SSH application 34. In this example, the caller is enabled to activate a selected visual object displayed on the screen by inputting an audio command, for example, a voice command entered via the microphone 12.

In particular, the audio signal presented by the SSH application 34 may suggest the caller to make her selection among visual objects presented on the screen by entering a voice command corresponding to a selected visual object. In response, the user may enter a voice command identifying the visual object displayed on the screen. For example, the user may enter a voice command "My usage" corresponding to the "My usage" object on the screen. In response, the SSH application 34 may display visual objects showing the usage details on the screen, and may produce an audio signal presenting information on the usage details displayed on the screen.

In an alternative embodiment, a greeting produced in response to a user's call may include video information displayed on the screen to assist the user in navigating through the IMR procedure. Normally, the SSH application launch takes a few seconds. The video greeting may be presented during that time. For example, instead of just presenting an audio that says "Welcome to Verizon wireless," a video may be presented to say so.

Also, video greeting clips can be inserted at any stage of the IMR procedure 100 in response to any user's input. This video greeting may include a video object produced in accordance with the user's input. For example, for different user inputs, different video playbacks may be pre-recorded and played when the corresponding user inputs are detected. As a result, the video greeting would become interactive. For example, if the user's input indicates that the user needs support, an interactive video clip can be played to make automated support easier and more effective.

Returning to the call flow in FIG. 2, the IMR procedure 100 in step 108 determines whether the interactive multimedia response provided by the above-described combination of visual objects and audio signals is sufficient to satisfy user's needs. For example, an audio signal may be produced to ask the user whether or not further assistance is required. If the interactive multimedia response is sufficient, the call is terminated (step 110). Sufficiency may be determined based on the user's input. For example, if the interactive multimedia response is sufficient to satisfy user's needs, such as paying a bill or changing a plan, the user does not select an option to speak to a call center agent.

If the user desires further assistance, the IMR procedure in step 112 routes the call so as to enable the user to contact a customer service representative. For example, the call may be routed to the IMR menu that presents audio signals corresponding to available options so as to enable the user to select another option among the available options. Further, a call may be routed through the mobile communication network to a call center to enable the user to speak with an appropriate service representative. In this case, before routing the call, the IMR procedure 100 may request the SSH application 34 to provide context information collected during interaction with the user, so as to enable the IMR procedure 100 to route the call to the appropriate call center.

The context information may include, but not limited to, the user's location, a battery level of the user's phone, language settings on the phone, a network type (3G or 4G), a signal strength, a user type (business, consumer, employee etc), whether the user moving or not, whether the user is on contract or out of contract, the number of lines subscribed by the user, the average revenue per month received from the user, etc. All this information can be used to route the call to the most appropriate call center to best serve user's needs. For example, the priority of the call may be enhanced if the battery level of the user's phone is low. If the user is driving, she may be treated differently that a user calling from a stationary location.

The appropriate call center can be different from the call center originally selected by dialing a predetermined telephone number. For example, if the caller is running low on battery, the call priority may be increased and the user may be routed to a high priority call center to make sure that the call can be answered before the battery runs out. Similarly, if the user is in a particular location, such as New York, N.Y., the may be routed to a call center arranged for the New York, N.Y. customers.

Alternatively, the user may be instructed to activate visual object "Contact Customer Service" displayed on the screen. When this object is activated, the user may be enabled to contact a customer service representative using instant messaging or chat service. These options may be made available by displaying corresponding visual objects.

Another exemplary embodiment of the present disclosure involves operation of the mobile station 10 in a Call Intercept Mode (CIM), in which the mobile station 10 displays visual objects corresponding to a selected service when the SSH application 34 detects that a user of the mobile station 10 dials a telephone number to a destination associated with providing the selected service. For example, a wireless telephone service provider may pre-set telephone numbers for enabling the user to place outgoing calls from the mobile station via a wireless network to destinations that provide various account related services. As discussed above, the number *611 may enable the user to place an outgoing call to a customer service call center. The telephone number #225 (#BAL) may be pre-set to make an outgoing call to a destination associated with providing account balance information. The telephone number #646 (#MIN) may be pre-set to connect the user to a destination associated with providing information on the minutes used in the current billing cycle. The telephone number #768 (#PMT) may be pre-set to connect the user to a destination associated with providing payment information, and the telephone number #3282 (#DATA) may be pre-set to connect the user to a destination associated with providing information on the data usage.

In conventional systems, dialing a number pre-set for providing an account related service may result in sending a short message service (SMS) message to the mobile station with requested information. However, this procedure requires the user to perform several steps before the information can be obtained. The user has to listen to a voice response, accept the SMS message, go to Inbox and read the message. Moreover, as discussed above, if the user dials a customer service number, she also needs to perform several steps until a required service can be obtained.

In the CIM of the present disclosure, the mobile station 10 detects a predetermined telephone number entered by a user or selected among pre-set numbers in the station's contact list, to place an outgoing call to a destination for providing a service associated with the predetermined telephone number. As a result of detecting which telephone number has been entered, the mobile station 10 presents to the user a visual display specific to the requested service, in lieu of transmitting the outgoing call placed by the user to the corresponding destination.

Figure 5:
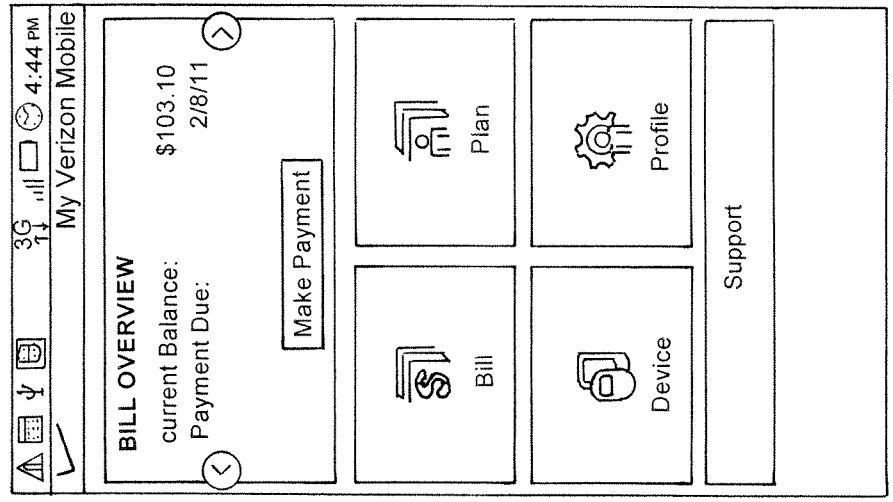
FIGS. 5-9 illustrate examples of visual objects displayed by the mobile station when a user dials exemplary telephone numbers in a Call Intercept Mode (CIM).
Figure 5:
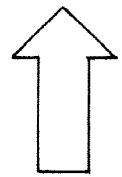
Figure 5:
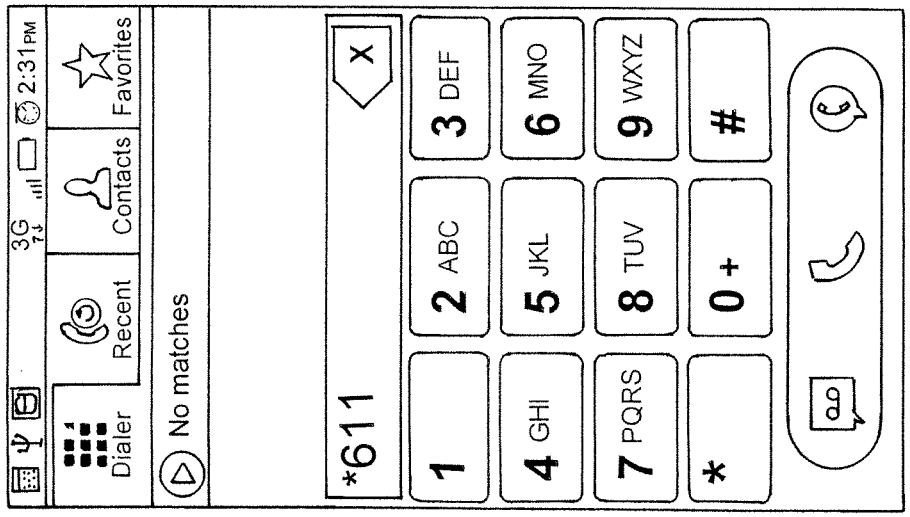
Figure 6:
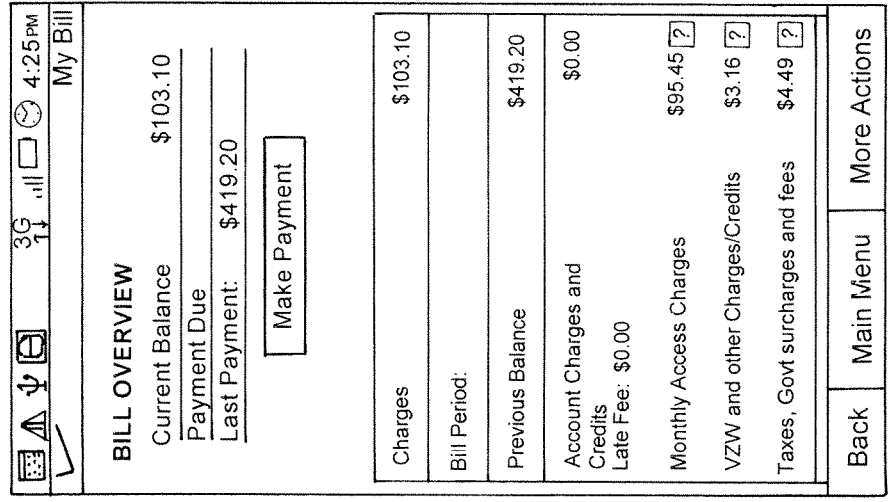
Figure 6:
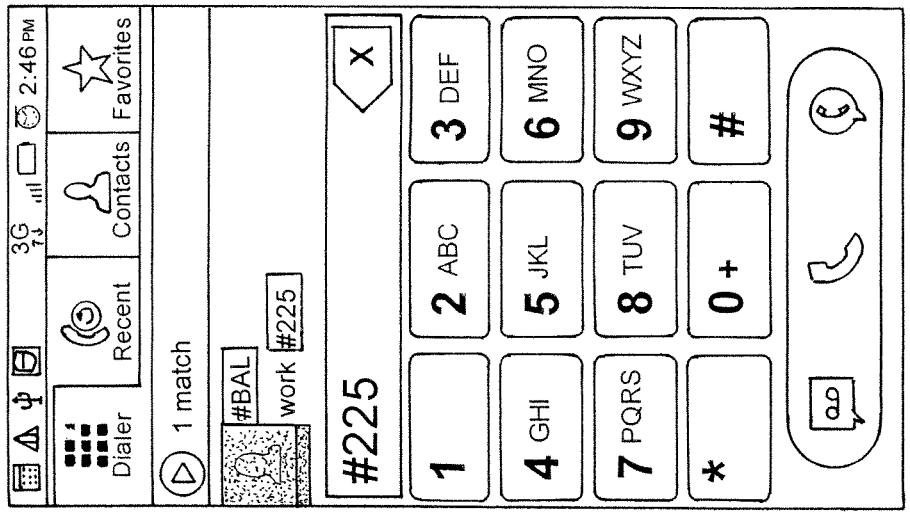
Figure 7:
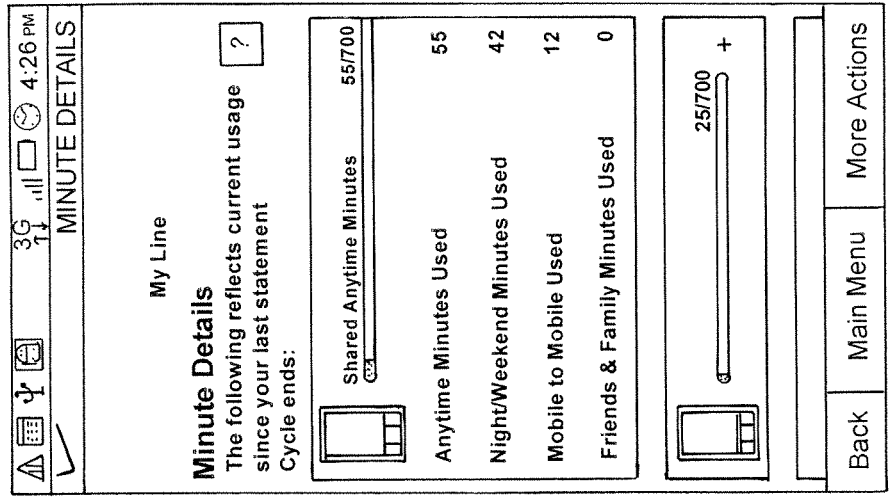
Figure 7:
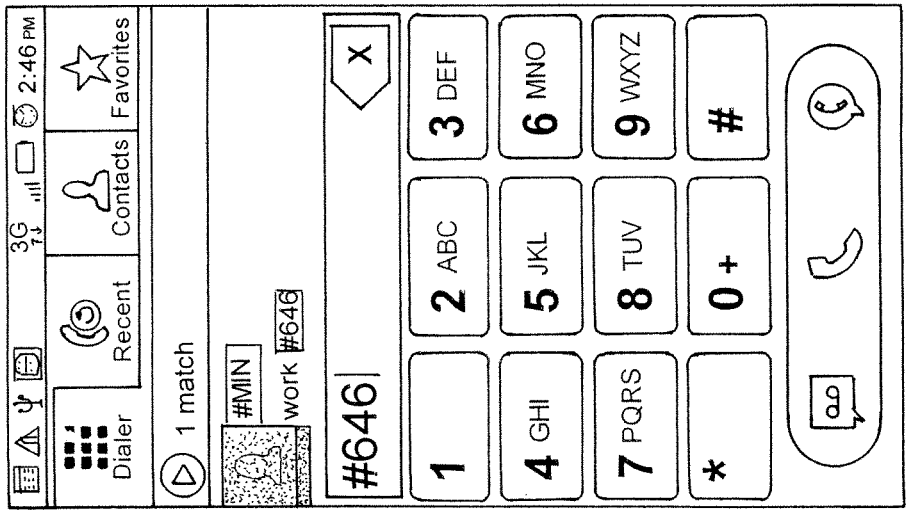
Figure 8:
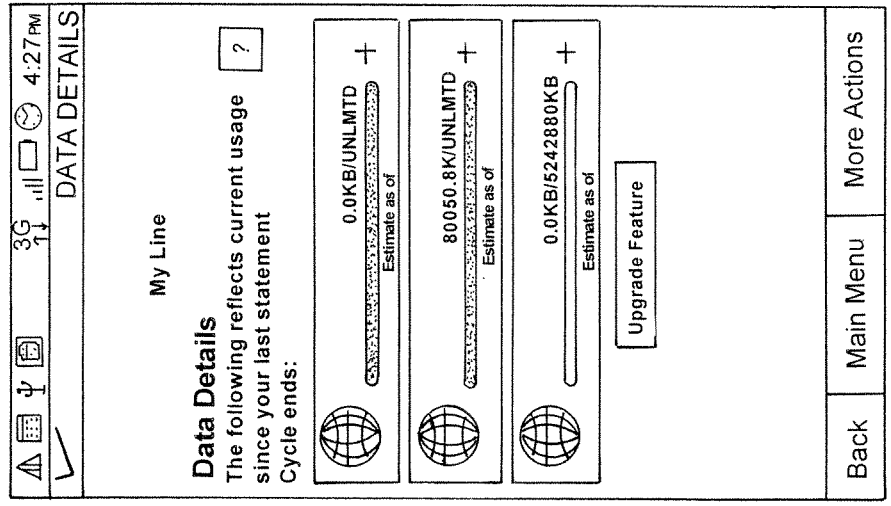
Figure 8:
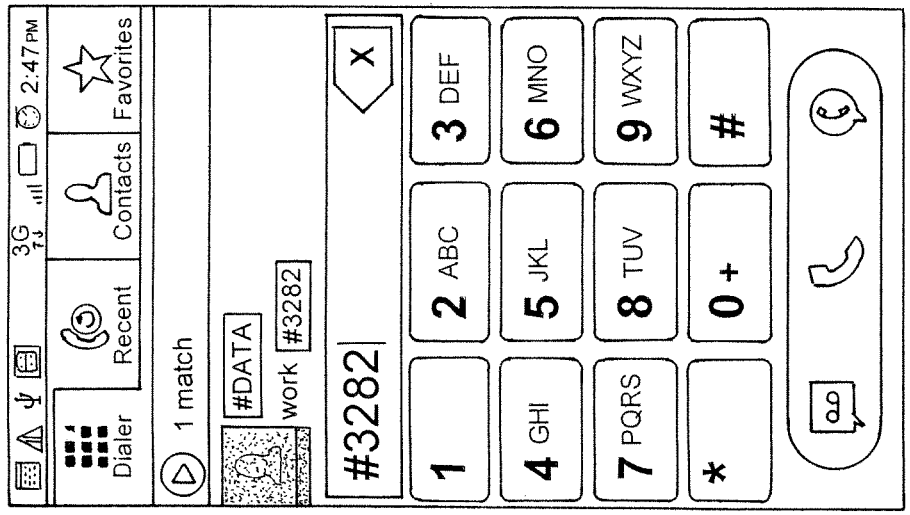
Figure 9:
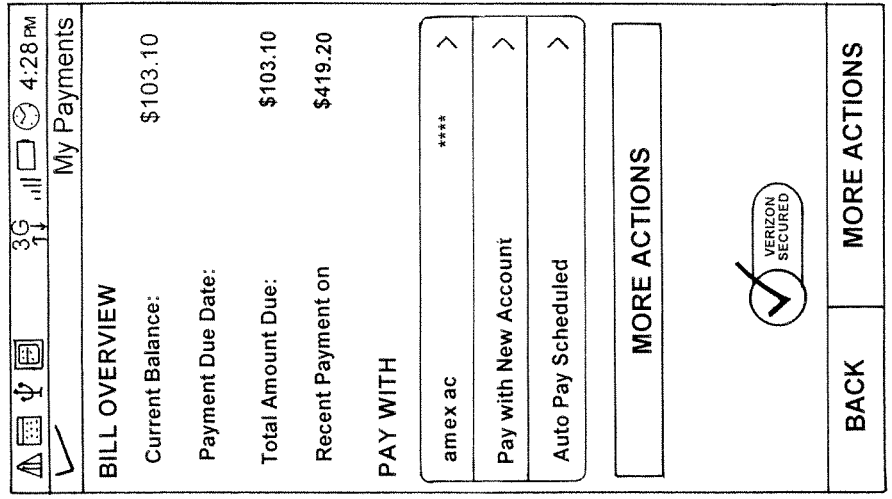
Figure 9:
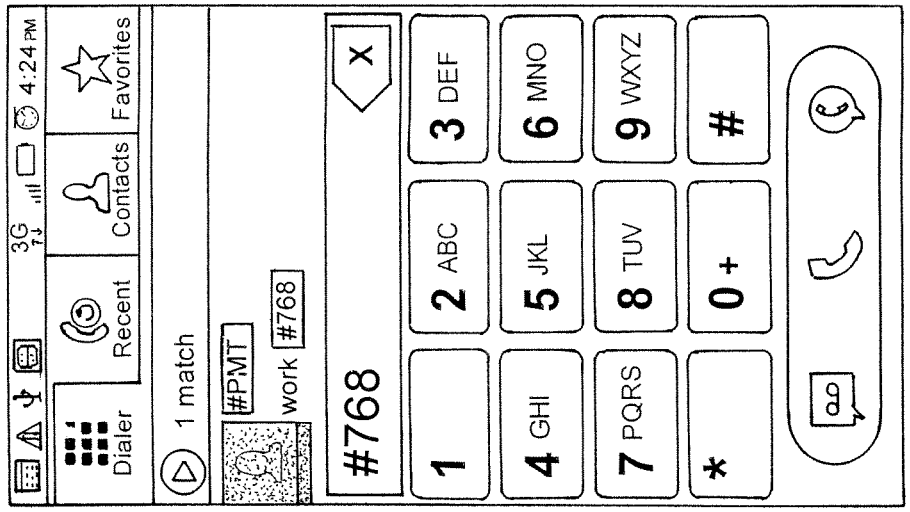

FIGS. 5-9 illustrate examples of visual objects displayed by the mobile station when particular telephone numbers are dialed. FIG. 5 illustrates a visual object displayed when a user dials the telephone number *611, FIG. 6 illustrates a visual object displayed when the telephone number #225 (#BAL) is dialed, FIG. 7 illustrates a visual object displayed when the telephone number #646 (#MIN) is dialed, FIG. 8 illustrates a visual object displayed when the telephone number #3282 (#DATA) is dialed, FIG. 9 illustrates a visual object displayed when the telephone number #768 (#PMT) is dialed.

Figure 10:
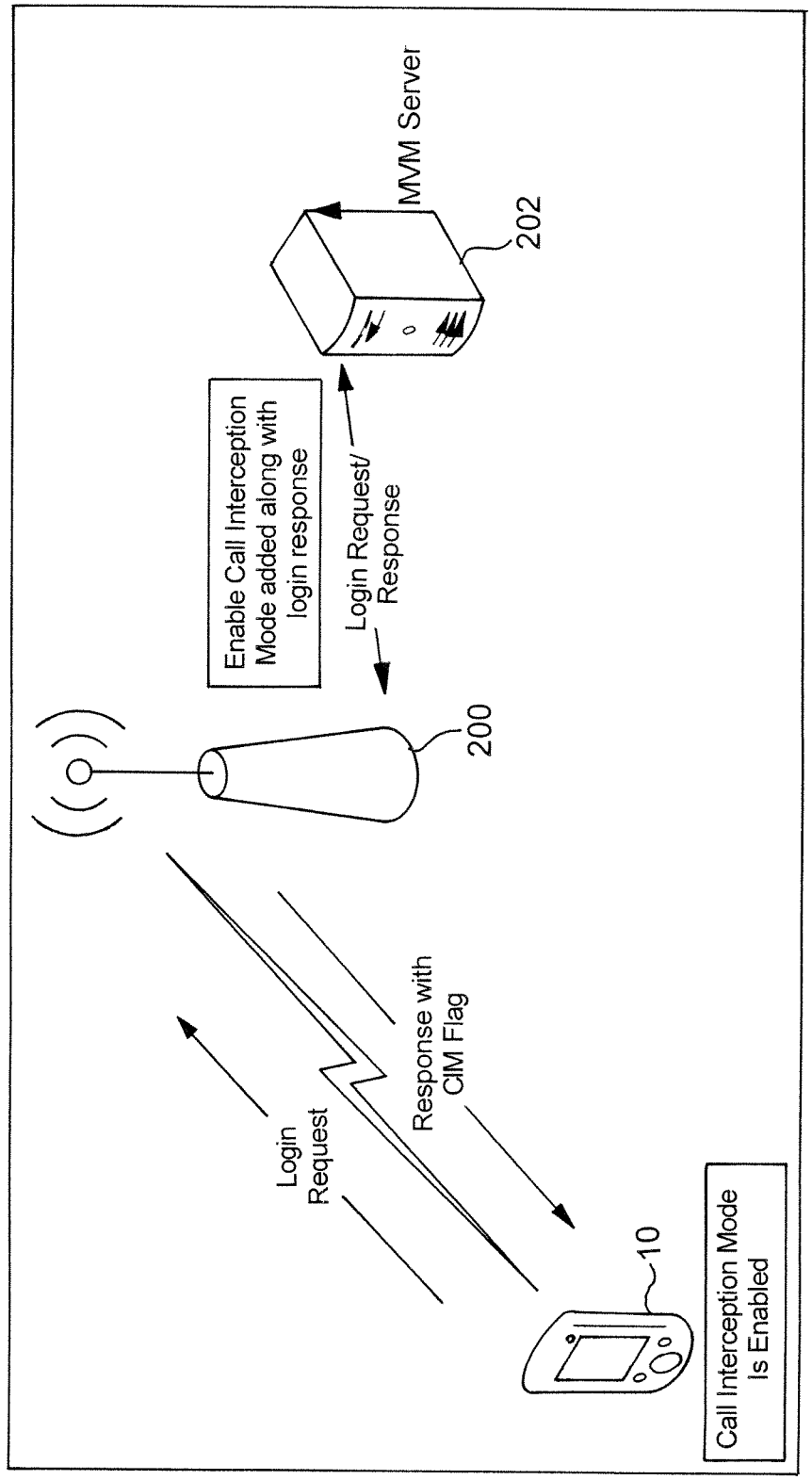
FIGS. 10 and 11 respectively illustrate examples of procedures performed to enable and disable the CIM.
Figure 11:
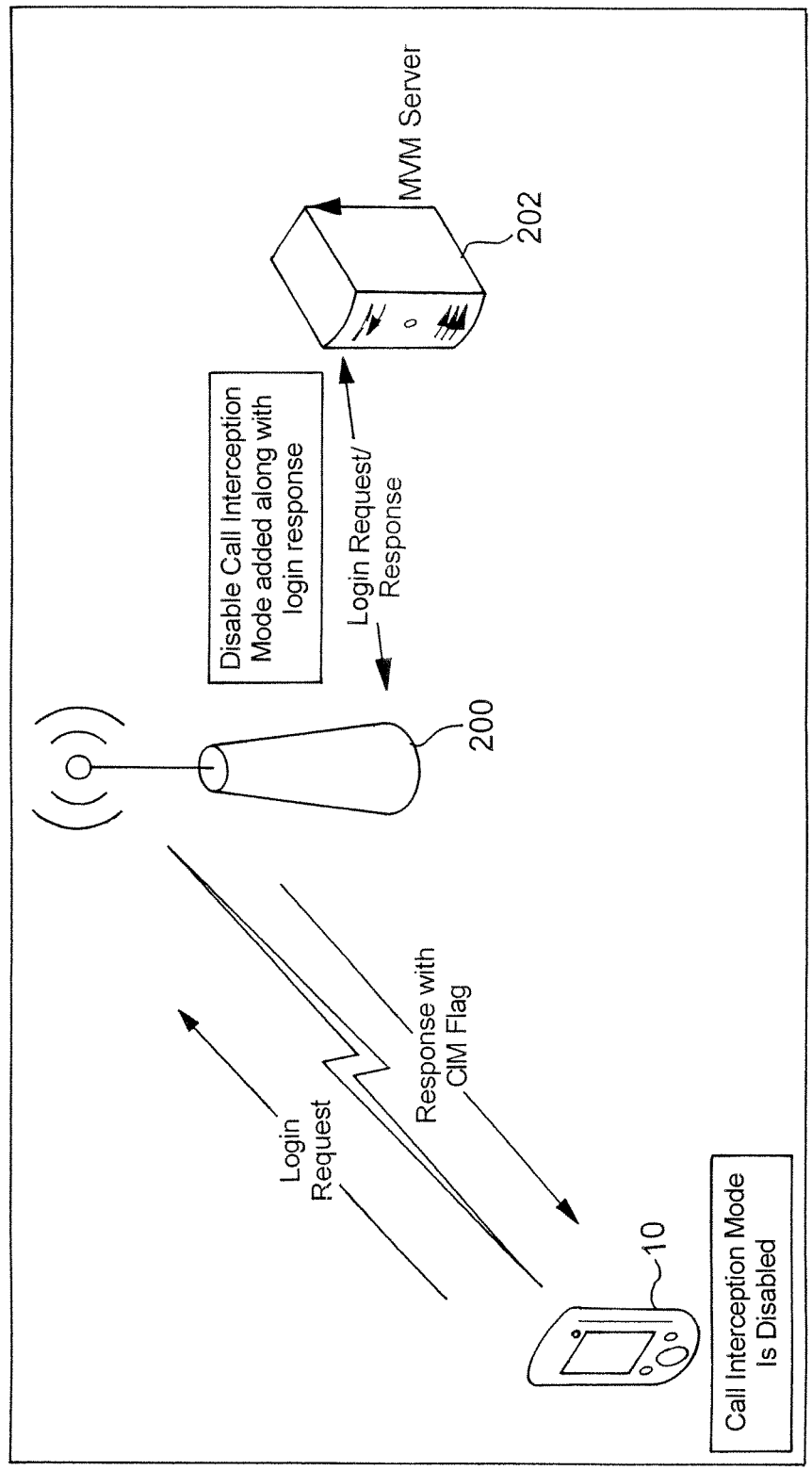

The CIM may be enabled for a group of mobile stations or for a particular mobile station. As illustrated in FIG. 10, the CIM for a mobile station 10 may be enabled when the mobile station 10 provides a login request to login to a data network for the first time. Via a base station 200, the login request is transmitted to a management server 202 that provides a CIM enabling signal together with a login response. As illustrated in FIG. 11, the CIM may be disabled also upon a login request from the mobile station 10. The management server 202 provides a CIM disabling signal together with a login response.

Figure 12:
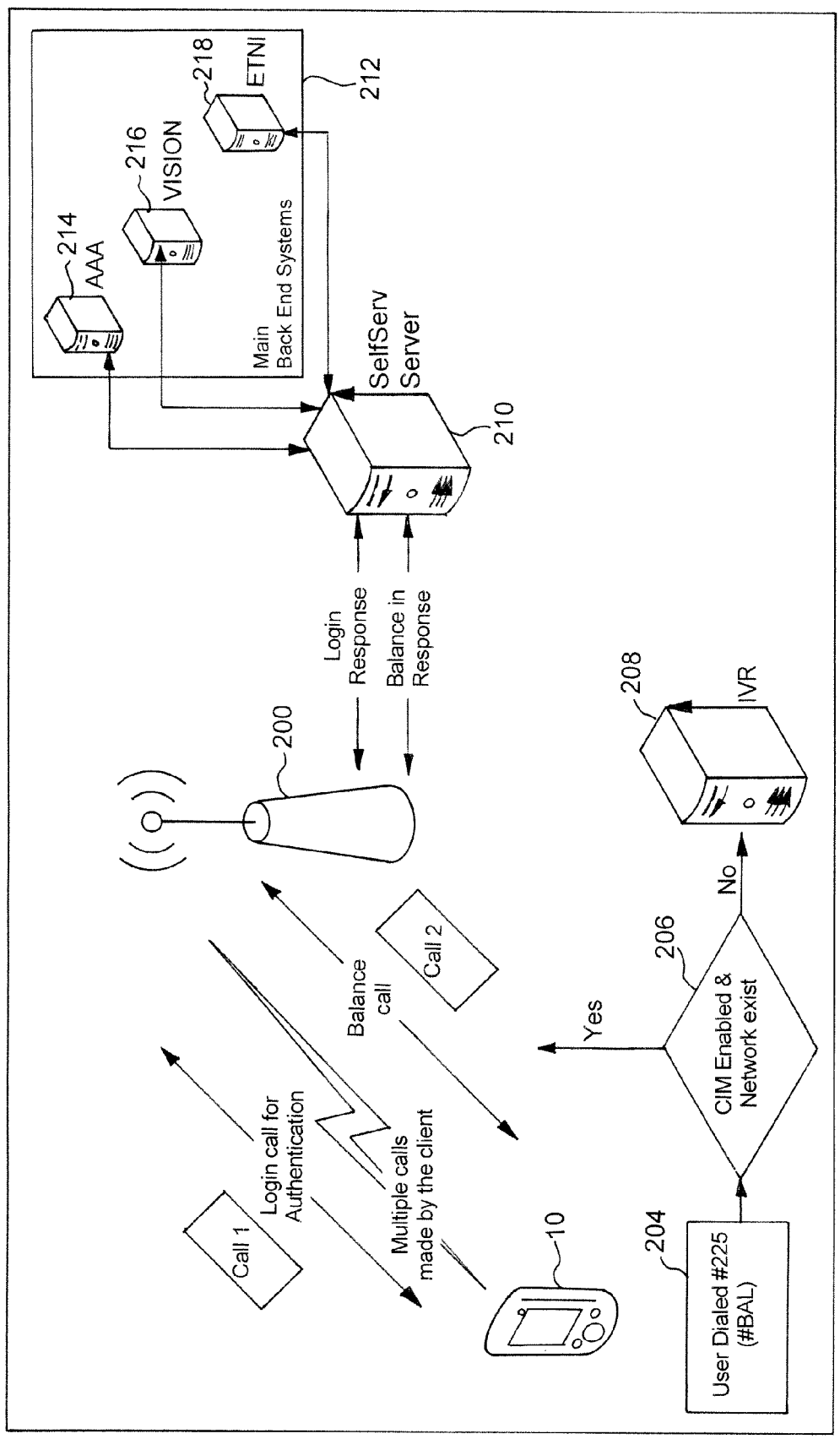
FIGS. 12-16 are exemplary call flow diagrams illustrating the intercept of outgoing calls associated with some service related telephone numbers.
Figure 13:
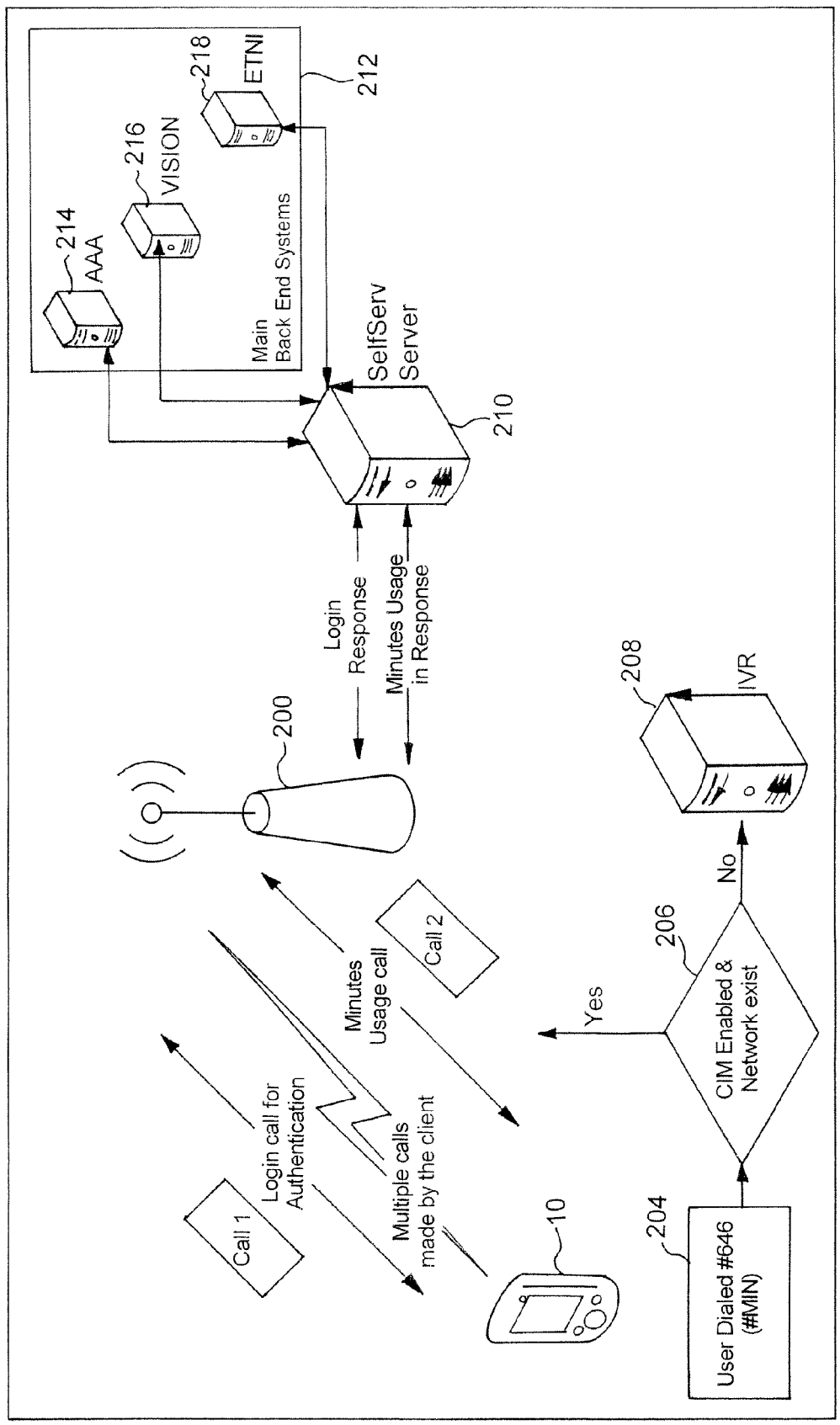
Figure 14:
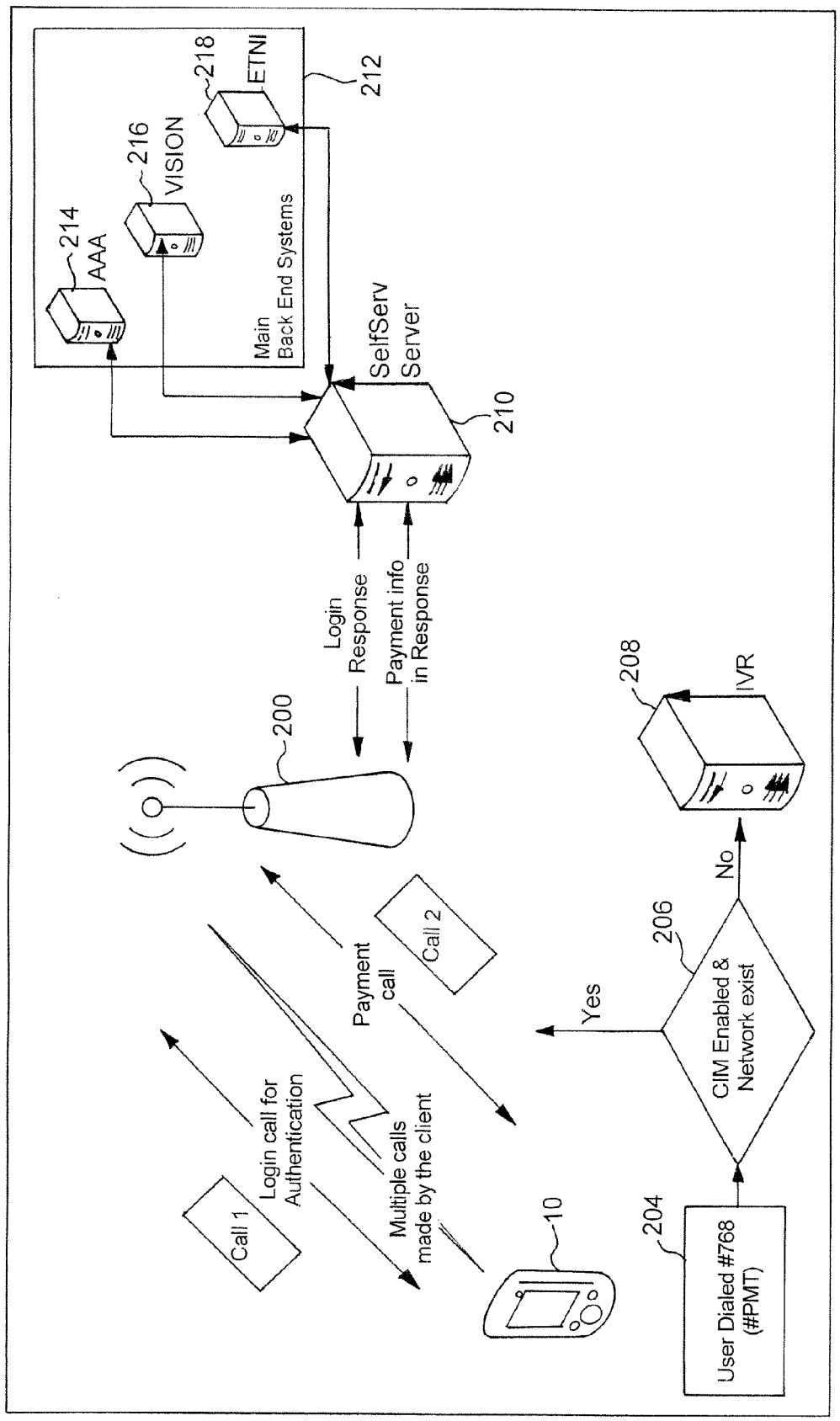
Figure 15:
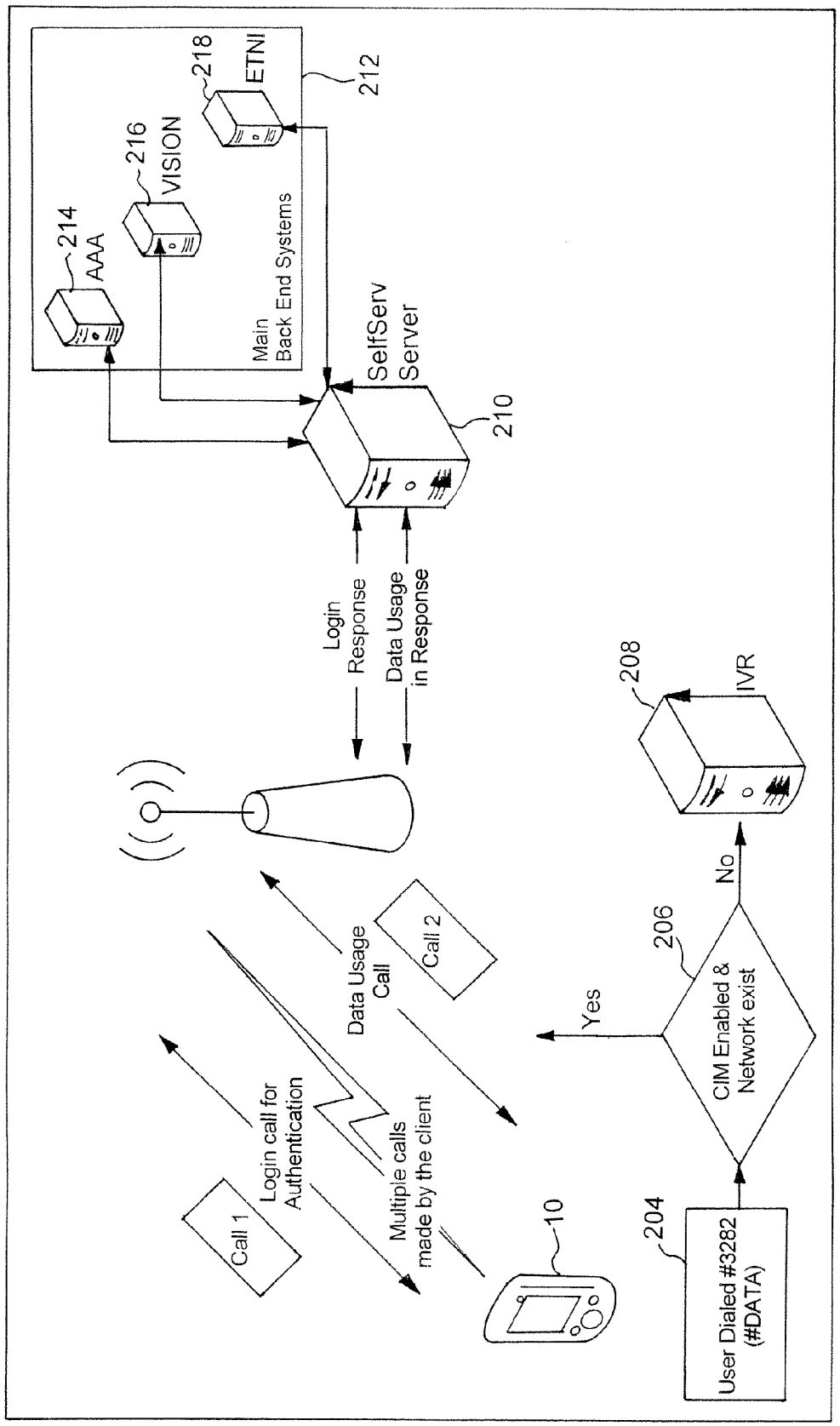
Figure 16:
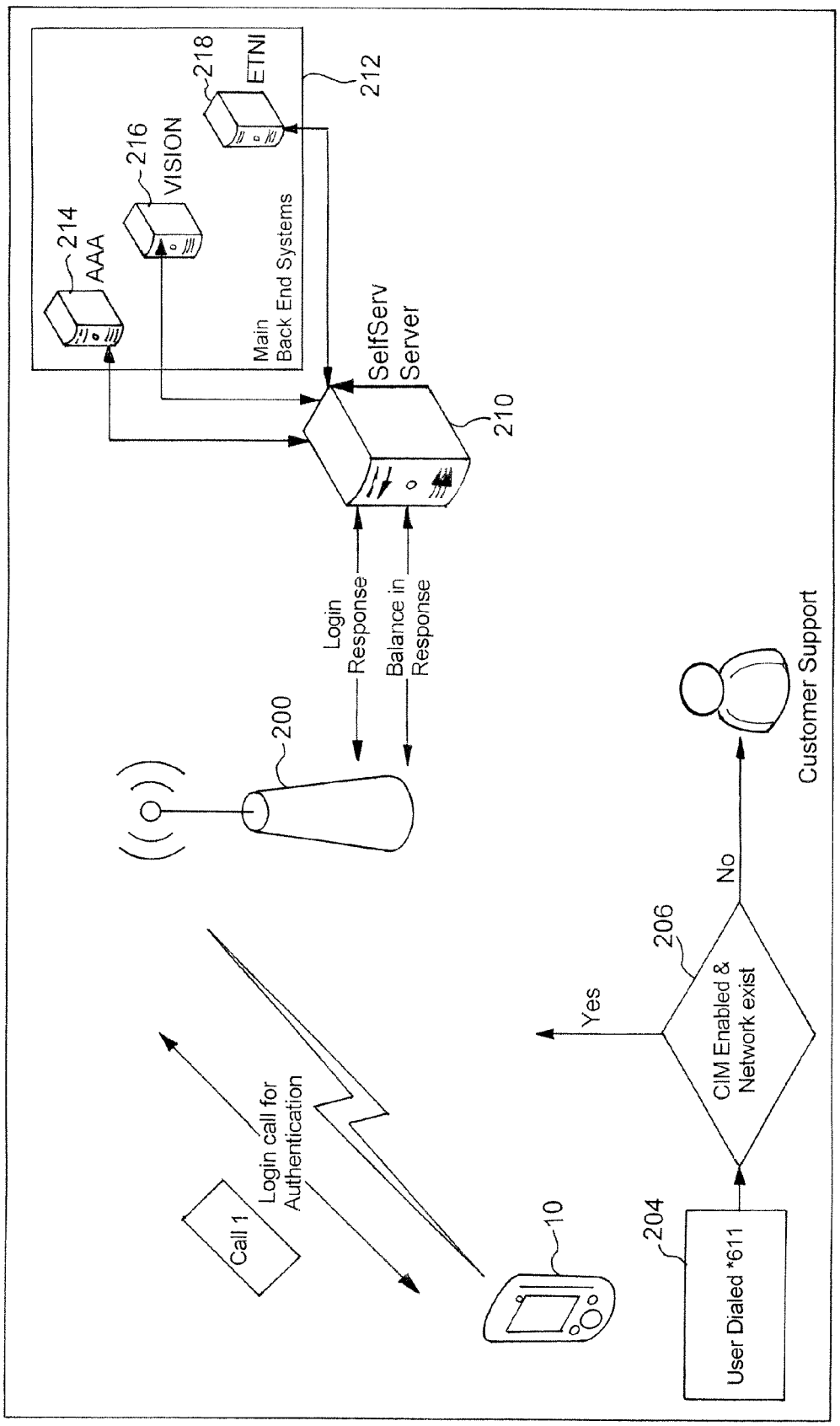

FIGS. 12-16 show exemplary call flows illustrating operations performed by various devices when the SSH application 34 on the mobile station 10 intercepts user's calls at predetermined telephone numbers. In particular, FIG. 12 shows a call flow performed when the user dials the #225 number (#BAL). FIG. 13 shows a call flow performed when the user dials the #646 number (#MIN). FIG. 14 shows a call flow performed when the user dials the #768 number (#PMT). FIG. 15 shows a call flow performed when the user dials the #3282 number (#DATA). FIG. 16 shows a call flow performed when the user dials the *611 number.

A base station 200 provides transmission and reception of signals to and from the mobile station 10 over a wireless data network. When the user of the mobile station 10 dials a predetermined number (block 204), the SSH application 34 determines whether CIM is enabled and a data network exists (block 206). As shown in FIGS. 12-15, when the CIM is not enabled or a data network does not exist, the SSH application 34 causes the mobile station 34 to initiate a telephone call routed over a wireless telephone network to an Interactive Voice Response (IVR) server 208 performing IVR operations. The IVR server 208 interacts with the user, by collecting user inputs entered using a telephone keypad and responding with voice. For example, when the user dials a customer service number, the IVR greets the user with audio content and guides her using audio step-by-step instructions providing the user with available choices, such as press 1 for hearing your balance, press 2 for bill information, etc. When the user presses a selected key, the IVR responds with an audio response based on the pressed key. In the call flow in FIG. 16, when the CIM is disabled, the user is routed to a customer service representative.

Further, the devices shown in FIGS. 12-16 include a self service server 210 interacting with the mobile station 10 to provide services requested by the user, and main back end systems 212 supporting the self service server 210. The main back end systems 208 may include an Authentication, Authorization and Accounting (AAA) system 214, a billing system 216, such as a VISION billing system, and a telephone number database system 218, such as an Enterprise Telephone Number Inventory (ETNI) system.

Figure 17:
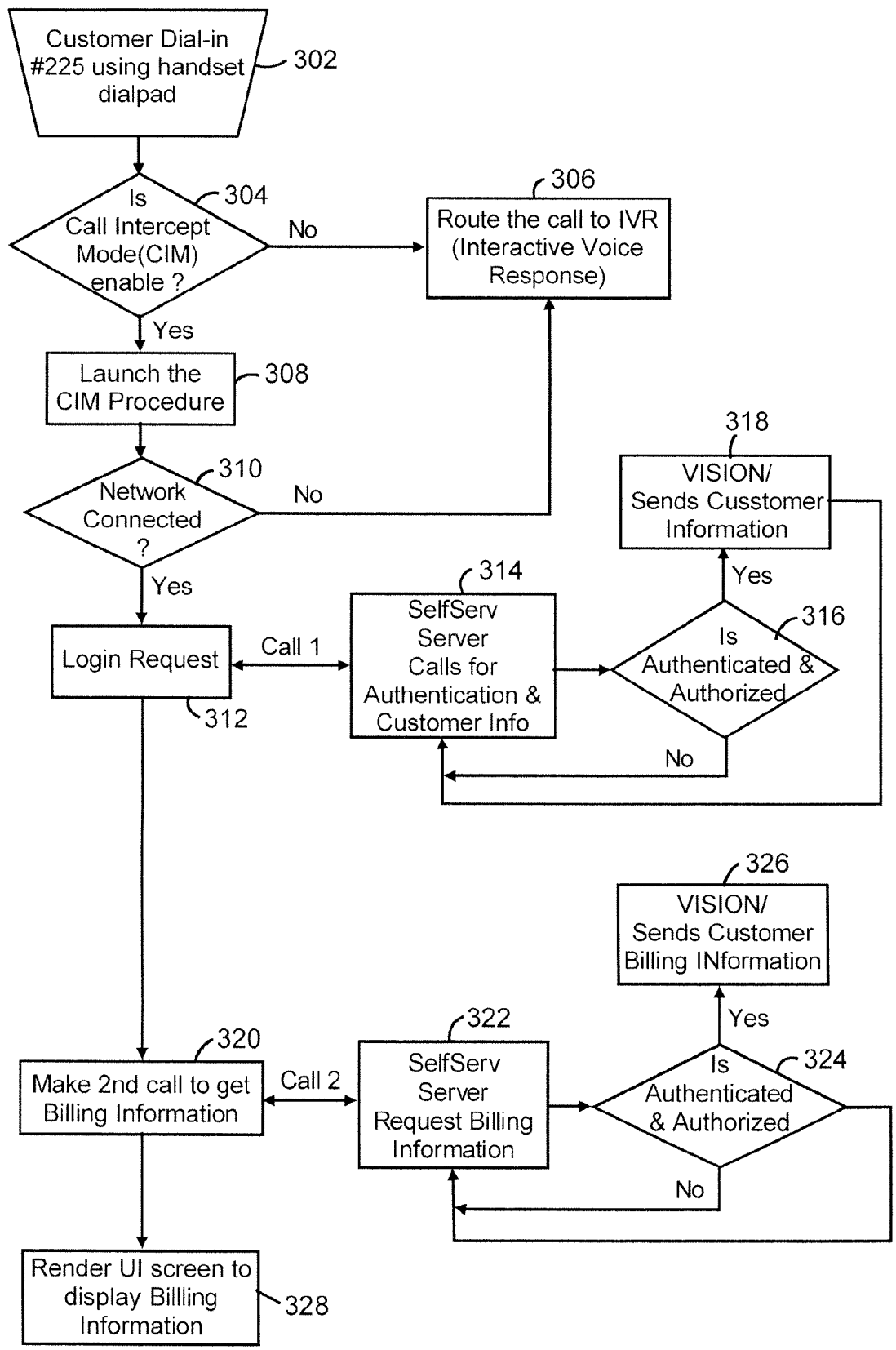
FIG. 17 is a flow diagram illustrating operations performed in the CIM.

For example, as shown in FIG. 12 and illustrated by a flow chart in FIG. 17, when in step 302, the SSH application 34 detects that the user of the mobile station 10 dials the number #225 (#BAL) to obtain account balance information, the SSH application 34 performs step 304 to determine whether the CIM is enabled. If the CIM is not enabled, the user's call may be routed to the IVR server 208 that provides the account balance information using the IVR procedure.

If the CIM is enabled, the SSH application 34 launches the CIM procedure (step 308) that begins with determining whether the data network exists (step 310). If the mobile station 10 is not connected to the data network, the call is routed to the IVR server 208 (step 306).

If the CIM is enabled and the mobile station 10 is connected to the data network, the SSH application 34 initiates a login request (step 312) to login to the data network. The SSH application 34 causes the XCVR 22 to transmit data call 1 carrying the login request from the mobile station 10. The call 1 is transferred via the base station 200 to the self service server 210 (step 314), which interacts with the AAA server 214 and the ETNI system 218 to provide authentication of the mobile station 10 and obtain authorization for providing the mobile station 10 with the requested information. If the mobile station 10 is authenticated and the authorization is obtained (step 316), the self service server 210 requests the VISION billing system 216 to provide the account information of the user (step 318). If the authentication and/or authorization procedure fail the self service server 210 may repeat this procedure.

Based on the user's account information from the VISION billing system 216, the self service server 210 provides a login response sent via the base station 200 to the mobile station 10 to indicate that the requested information is available. Upon detecting the login response, the SSH application 34 causes the XCVR 22 to initiate call 2 to the self service server 210 to request the account balance information (step 320). The call 2 is transferred to the self service server 210 via the base station 200. In response to the call 2, the self service server 210 provides a request for the account balance information of the user (step 322). Before sending this request to the VISION billing system 216, the self service server 210 repeats the authentication and authorization procedure with respect to the mobile station 10 (step 324). If the mobile station 10 is authenticated and the authorization is obtained, the self service server 210 requests the VISION billing system 216 to provide the account balance information of the user (step 326).

Upon receiving the account balance information from the VISION billing system 216, the self service server 210 send this information to the mobile station 10 via the base station 200. When the account balance information is received by the mobile station 10, the SSH application 34 causes the display 20 to produce a user interface screen to display a visual object including the account balance information (step 328).

When the SSH application 34 detects that the user of the mobile station 10 dials another number, such as one of the telephone numbers illustrated in call flows in FIGS. 13-15, to obtain different account related information, the SSH application 34 operates in a manner similar to operations described above in connection with FIG. 17. The call flow in FIG. 16, when the user dials the *611 customer service number, may involve only the call 1 carried out to perform the authentication and authorization procedure in the manner described above. In each of these techniques, calls 1 and 2 are transparent to the user, i.e., calls 1 and 2 occur without further user input.

Figure 18:
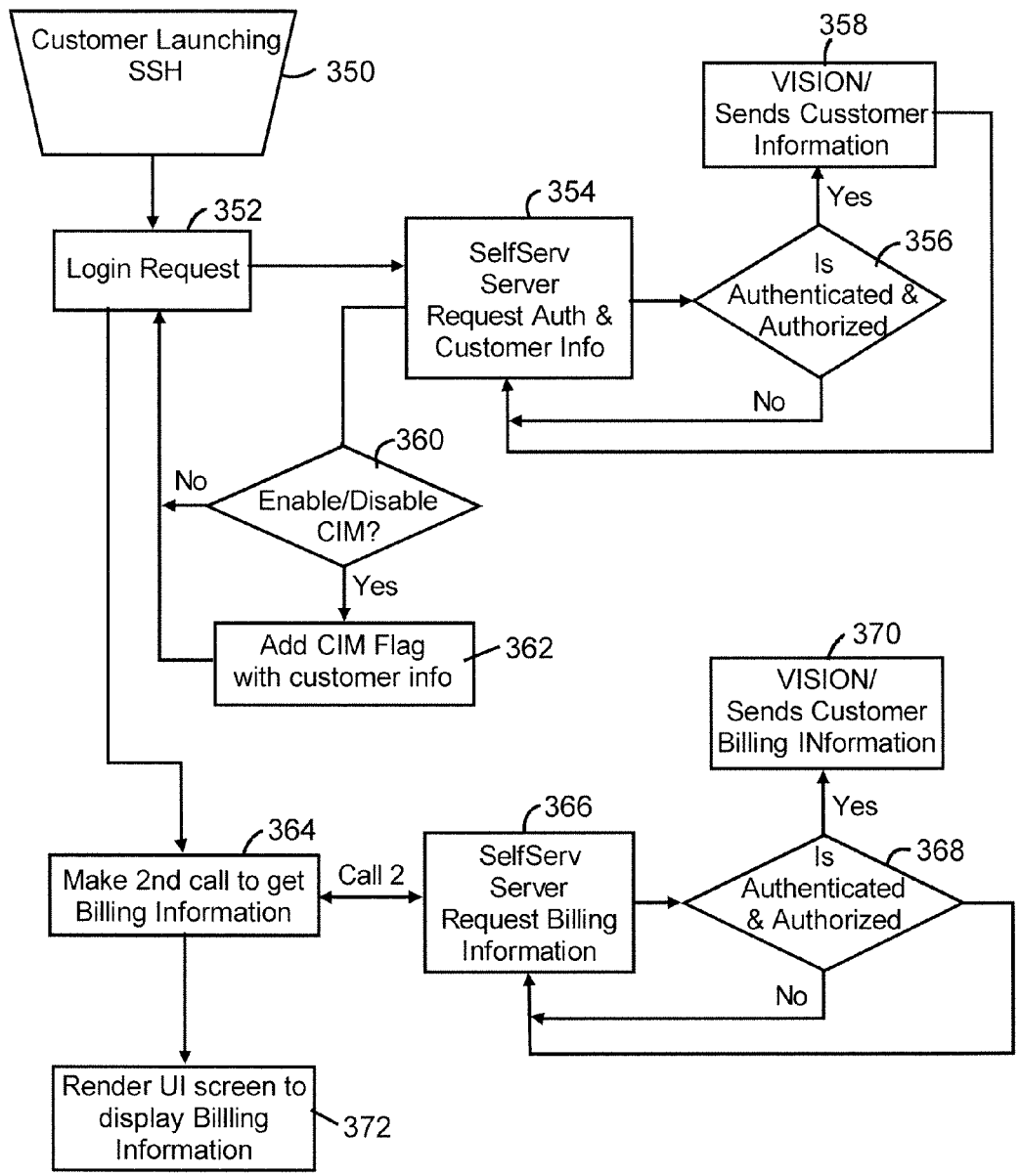
FIG. 18 is a flow diagram illustrating operations preformed to enable the CIM.

FIG. 18 illustrates operations performed to enable CIM. When the SSH application 34 is launched (step 350), a login request is provided (step 352) to login to the data network. The SSH application 34 causes the XCVR 22 to transmit data call 1 carrying the login request from the mobile station 10. The call 1 is transferred via the base station 200 to the self service server 210 (step 354), which interacts with the AAA server 214 and the ETNI system 218 to provide authentication of the mobile station 10 and obtain authorization for providing the mobile station 10 with the requested information. If the mobile station 10 is authenticated and the authorization is obtained (step 356), the self service server 210 requests the VISION billing system 216 to provide the account information of the user (step 358). If the authentication and/or authorization procedure fail the self service server 210 may repeat this procedure.

Based on the user's account information from the VISION billing system 216, the self service server 210 provides a login response sent via the base station 200 to the mobile station 10 to indicate that the requested information is available. In addition the self service server 210 determines whether CIM is enabled or disabled (step 360). If the CIM is enabled, the self service server 210 adds CIM flag to the login response (step 362). If the CIM is disabled, the login response is provided without CIM flag.

Upon detecting the login response, the SSH application 34 causes the XCVR 22 to initiate call 2 to the self service server 210 to request billing information (step 364). The call 2 is transferred to the self service server 210 via the base station 200. In response to the call 2, the self service server 210 provides a request for the billing information of the user (step 366). Before sending this request to the VISION billing system 216, the self service server 210 repeats the authentication and authorization procedure with respect to the mobile station 10 (step 368). If the mobile station 10 is authenticated and the authorization is obtained, the self service server 210 requests the VISION billing system 216 to provide the billing information of the user (step 370).

Upon receiving the billing information from the VISION billing system 216, the self service server 210 send this information to the mobile station 10 via the base station 200. When the billing information is received by the mobile station 10, the SSH application 34 causes the display 20 to produce a user interface screen to display a visual object including the billing information (step 372).

As shown by the discussion above, a number of aspects of the IMR and CIM procedures rely on programming of the mobile stations. Program aspects of the technology may be thought of as products or articles of manufacture, typically in the form of executable code and/or associated data that is carried on or embodied in a type of machine readable medium, for mobile station execution. Storage media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or affiliate into one or more of the mobile stations. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory storage media, terms such as computer or machine "readable medium" refer to any medium that participates in providing instructions to a processor for execution.

Hence, a machine readable medium may take many forms, including but not limited to, a tangible non-transitory storage medium, a carrier wave medium or a physical transmission medium. Non-volatile storage media include, for example, optical or magnetic disks, such as any of the storage devices in mobile stations shown in the drawings or in any computer (s) or the like that may be used to supply such programming to the mobile stations for installation and/or upgrade purposes. Volatile storage media include dynamic memory, such as main memory of such a computer platform or of any of the mobile stations. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer or machine readable media therefore include for example: a floppy disk, a flexible disk, hard disk, magnetic tape, any other magnetic medium, a CD-ROM, DVD or DVD-ROM, any other optical medium, any other physical storage medium with patterns of holes, a RAM, a PROM, an EPROM and an EEPROM, a FLASH-EPROM, any other memory chip or cartridge, a carrier wave transporting data or instructions, cables or links transporting such a carrier wave, or any other medium from which a computer or other machine can read programming code and/or data. Many of these forms of computer readable media may be involved in carrying one or more sequences of one or more coded instructions to a processor for execution for example in a mobile station.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of operating a mobile station, comprising the steps of:

detecting user input of a selected one of a plurality of destination numbers on the mobile station, each of the destination numbers corresponding to one of a plurality of account related services;

responsive to the user input detecting, intercepting outgoing communication to a destination otherwise associated with the one detected destination number;

responsive to the communication intercepting, executing a self-service application on the mobile station to transfer the communication via a wireless communication network to a self service server requesting authentication of the mobile station to the wireless communication network;

if the mobile station is authenticated to the network, obtaining from the server, via the communication through the network, account specific data for a user account associated with the mobile station and specific to the account related service corresponding to the one detected destination number;

based on further execution of the self-service application on the mobile station, presenting a visual display to the user on the mobile station including the data for the user account specific to the account related service corresponding to the one detected destination number;

prior to the detecting step:

upon first detecting user input of any of the plurality of destination numbers on the mobile station, sending an inquiry through the mobile communication network from the mobile station to determine if service calls to the destination numbers should be intercepted;

responsive to an instruction received through the mobile communication network from the server, activating an intercepting function on the mobile station to enable intercepting of outgoing communications responsive to user inputs of the plurality of destination numbers; and responsive to another instruction received through the mobile communication network from the server, deactivating the intercepting function on the mobile station to disable intercepting of outgoing communications responsive to user inputs of the plurality of destination numbers.

2. The method of claim 1, further comprising performing an interactive voice response function in response to the user input if the intercepting function is deactivated.

3. The method of claim 1, wherein the communication through the network includes a first call from the mobile station to the self service server performed to provide the authentication of the mobile station, and a second call from the mobile station to the self service server performed to obtain the server account specific data.

4. A mobile station for providing communications, comprising:
  a display device for displaying visual objects, and
  a processor configured for:
    detecting user input of a selected one of a plurality of destination numbers on the mobile station, each of the destination numbers corresponding to one of a plurality of account related services;
    responsive to the user input detecting, intercepting outgoing communication to a destination otherwise associated with the one detected destination number;
    responsive to the communication intercepting, executing a self-service application on the mobile station to transfer the communication via a wireless communication network to a self service server requesting authentication of the mobile station to the wireless communication network;
    if the mobile station is authenticated to the network, obtaining from the server, via the communication through the network, account specific data for a user account associated with the mobile station and specific to the account related service corresponding to the one detected destination number;
    based on further execution of the self-service application on the mobile station, presenting a visual display to the user on the display device, including the data for the user account specific to the account related service corresponding to the one detected destination number;
    upon first detecting user input of any of the plurality of destination numbers on the mobile station, sending an inquiry through the mobile communication network from the mobile station to determine if service calls to the destination numbers should be intercepted;
    responsive to an instruction received through the mobile communication network from the server, activating an intercepting function on the mobile station to enable intercepting of outgoing communications responsive to user inputs of the plurality of destination numbers; and
    responsive to another instruction received through the mobile communication network from the server, deactivating the intercepting function on the mobile station to disable intercepting of outgoing communications responsive to user inputs of the plurality of destination numbers.

5. The mobile station of claim 4, wherein the processor is further configured for performing an interactive voice response function in response to the user input if the intercepting function is deactivated.

6. The mobile station of claim 4, wherein the communication through the network includes a first call from the mobile station to the self service server performed to provide the authentication of the mobile station, and a second call from the mobile station to the self service server performed to obtain the server account specific data.

7. An article of manufacture comprising:
  a non-transitory machine readable storage medium; and
  executable code for a mobile station embodied in the medium,
  wherein execution of the code by a processor in the article of manufacture causes the mobile station to implement functions of the mobile station comprising:
    detecting user input of a selected one of a plurality of destination numbers on the mobile station, each of the destination numbers corresponding to one of a plurality of account related services;
    responsive to the user input detecting, intercepting outgoing communication to a destination otherwise associated with the one detected destination number;
    responsive to the communication intercepting, executing a self-service application on the mobile station to transfer the communication via a wireless communication network to a self service server requesting authentication of the mobile station to the wireless communication network;
    if the mobile station is authenticated to the network, obtaining from the server, via the communication through the network, account specific data for a user account associated with the mobile station and specific to the account related service corresponding to the one detected destination number;
    based on further execution of the self-service application on the mobile station, presenting a visual display to the user on the mobile station including the data for the user account specific to the account related service corresponding to the one detected destination number;
    upon first detecting user input of any of the plurality of destination numbers on the mobile station, sending an inquiry through the mobile communication network from the mobile station to determine if service calls to the destination numbers should be intercepted;
    responsive to an instruction received through the mobile communication network from the server, activating an intercepting function on the mobile station to enable intercepting of outgoing communications responsive to user inputs of the plurality of destination numbers; and
    responsive to another instruction received through the mobile communication network from the server, deactivating the intercepting function on the mobile station to disable intercepting of outgoing communications responsive to user inputs of the plurality of destination numbers.

8. The article of manufacture of claim 7, wherein execution of the code further causes the mobile station to perform an interactive voice response function in response to the user input if the intercepting function is deactivated.

9. The article of manufacture of claim 7, wherein the communication through the network includes a first call from the mobile station to the self service server performed to provide the authentication of the mobile station, and a second call from the mobile station to the self service server performed to obtain the server account specific data.

10. The method of claim 1, wherein the intercepting function is activated for a group of mobile stations.

11. The method of claim 1, wherein the intercepting function is activated in response to a login request provided by the mobile station to login to a data network.

12. The method of claim 11, wherein the authentication of the mobile station is requested by the self service server in response to the login request.

13. The mobile station of claim 4, wherein the intercepting function is activated for a group of mobile stations.

14. The mobile station of claim 4, wherein the intercepting function is activated in response to a login request provided by the mobile station to login to a data network.

15. The mobile station of claim 14, wherein the authentication of the mobile station is requested by the self service server in response to the login request.

16. The article of manufacture of claim 7, wherein the intercepting function is activated for a group of mobile stations.

17. The article of manufacture of claim 7, wherein the intercepting function is activated in response to a login request provided by the mobile station to login to a data network.

18. The article of manufacture of claim 17, wherein the authentication of the mobile station is requested by the self service server in response to the login request.

* * * * *